United States Patent [19]

Attilio et al.

[11] Patent Number: 4,868,436
[45] Date of Patent: Sep. 19, 1989

[54] ROTATING ELECTRIC MACHINE WITH EXTERNAL ROTOR

[75] Inventors: Mazzucchelli Attilio, Venegono Superiore; Masserini Natalino, Vimercate; Vivaldi Silvano, Cinisello Balsamo, Italy

[73] Assignee: Gruppo Industriale Ercole Marelli, S.p.A., Milan, Italy

[21] Appl. No.: 171,905

[22] Filed: Mar. 22, 1988

[30] Foreign Application Priority Data

May 7, 1987 [IT] Italy ................. 20417 A/87

[51] Int. Cl.$^4$ .......................... H02K 7/08; H02K 5/10
[52] U.S. Cl. ..................... 310/67 R; 310/88; 310/89; 310/90
[58] Field of Search ............ 310/67 R, 88, 89, 90, 310/254, 261, 91

[56] References Cited

U.S. PATENT DOCUMENTS

| 2,802,957 | 8/1957 | Gievers | 310/67 R |
|---|---|---|---|
| 3,385,510 | 5/1968 | Hollander . | |
| 4,032,807 | 6/1977 | Richter | 310/67 R |
| 4,471,250 | 9/1984 | Snider | 310/67 R |
| 4,607,182 | 8/1986 | Ballhaus | 310/67 R |
| 4,621,977 | 11/1986 | Markwardt . | |

FOREIGN PATENT DOCUMENTS

| 969793 | 7/1958 | Fed. Rep. of Germany | 310/67 |
|---|---|---|---|
| 2536094 | 2/1977 | Fed. Rep. of Germany . | |
| 2612537 | 9/1977 | Fed. Rep. of Germany . | |
| 225509 | 4/1987 | Japan | 310/88 |
| 837779 | 6/1960 | United Kingdom . | |
| 1356007 | 6/1974 | United Kingdom . | |

Primary Examiner—Patrick R. Salce
Assistant Examiner—D. L. Rebsch
Attorney, Agent, or Firm—Darcy, Donovan & Coleman

[57] ABSTRACT

A rotating electric machine with an external rotor constituted by an asynchronous motor with a cage rotor, in which the rotor structure, instead of being mounted protrudingly on a stationary axial supporting element is supported thereon by means of two end shields mounted by means of respective bearings on an axial supporting element, which is monolithic with a stationary supporting shield.

8 Claims, 3 Drawing Sheets

ROTATING ELECTRIC MACHINE WITH EXTERNAL ROTOR

BACKGROUND OF THE INVENTION

The present invention relates to a rotating electric machine with an external rotor, and more particularly to an electric motor with an external rotor cage.

Rotating electric machines with external rotors, and in particular asynchronous electric motors with external cage rotors, are known. The purposes of this constructive solution are well known and dictated by the requirements of the particular applications (such as, in particular, axial and centrifugal fans mounted directly on the rotor frame, devices which require a high inertia of the rotating masses and an enhancement of the self-ventilating effect, etc.).

A typical known form of construction of such a motor with an external rotor, given by way of comparison in FIG. 1, which will be discussed in greater detail hereinafter, comprises a supporting axial element constituted by a flanged bush which is protrudingly mounted on a stationary supporting shield, and externally supports the active stator parts and internally a coaxial shaft, mounted rotatably on bearings also internal to the bush, and with a shaft end protruding from the bush. On the shaft end which protrudes from the bush there is keyed the opposite shield, protrudingly and monolithically supporting the rotor frame and the related active parts contained therein ("rotor cage" and lamellar core).

Such a construction of the prior art has several disadvantages among which are the following:

difficult centering and critical plays of the rotating masses, due to the protruding mounting of the external rotor part on the shaft end protruding from the bush;

high stress and wear of the bearings, consequent to the protruding mounting of the rotating structure and to the concentricity errors deriving therefrom, with the aggravation that the need to contain the bearings inside the bush limits their size, and forces their operation in a hot environment and in an axially close mutual position;

noise, due to the above reasons;

need for forced mounting of the stator pack on the bush, with consequent deformation of the bearing seats;

oversizing of the diameter of the bush, which must contain the shaft at the expense of the active stator material;

plurality of parts, and of mechanical machinings of the related coupling surfaces.

SUMMARY OF THE INVENTION

The aim of the present invention is to eliminate the above described disadvantages of the prior art.

This aim is achieved, according to the present invention, in a rotating electric machine with an external rotor of the type previously mentioned, comprising a stationary axial supporting element with a substantially cylindrical outer surface, having an end rigidly associated with a stationary supporting shield, active stator parts mounted externally to the axial supporting element, and a rotor structure adapted to rotate externally to and coaxially to said active stator parts, the rotor structure being rotatively supported by the stationary axial supporting element, characterized in that the rotor structure comprises two rotating shields for the support of the active rotor part, rotatably supported by means of respective bearings at the two ends of the outer surface of the stationary axial supporting element, and in that the stationary axial supporting element has an axial hole, communicate with the outside of the machine through an opening in the stationary supporting shield and a radial hole through which the axial hole communicates with the connections side of the field winding.

Advantageously, the stationary axial supporting element is a tubular sleeve cast monolithically with the stationary supporting shield.

The structure according to the invention provides the following advantages:

1. A solid construction, which ensures a greater centering and squaring of the machine, thereby enabling the elimination of the noise due to the protruding rotor construction of the prior art;

2. The possibility of adopting greatly oversized bearings with normal play, positioned in relatively cool regions and well spaced from each other in an axial direction, thereby providing for a longer working life;

3. A reduction in dimensions of the structural parts thereby permitting an increase in the size of the active stator parts;

4. A significant reduction of the concentricity errors and therefore a further reduction in noise, by virtue of the possibility of performing a single-step mechanical machining of the bearing seats, of the stator pack seat and of the coupling abutment;

5. The possibility of easily reaching, with the addition of a small gasket ring, the IP 55 protection degree according to IEC norms.

Appropriately, the stator pack is locked on the stationary axial supporting element by a spline or key type coupling. This is facilitated by the greater radial dimensions of the crown of the stator active iron with respect to the structure according to the prior art, and enables the elimination of the deformation of the bearing seats due, in the embodiment according to the prior art, to the forced keying of the pack on the bush constituting the axial supporting element.

BRIEF DESCRIPTION OF THE DRAWINGS

Other advantages and features of the present invention will become apparent from the following detailed description of a preferred embodiment thereof, with reference to the accompanying drawings, wherein.

DESCRIPTION OF THE PREFERRED EMBODIMENTS

Figure 1:
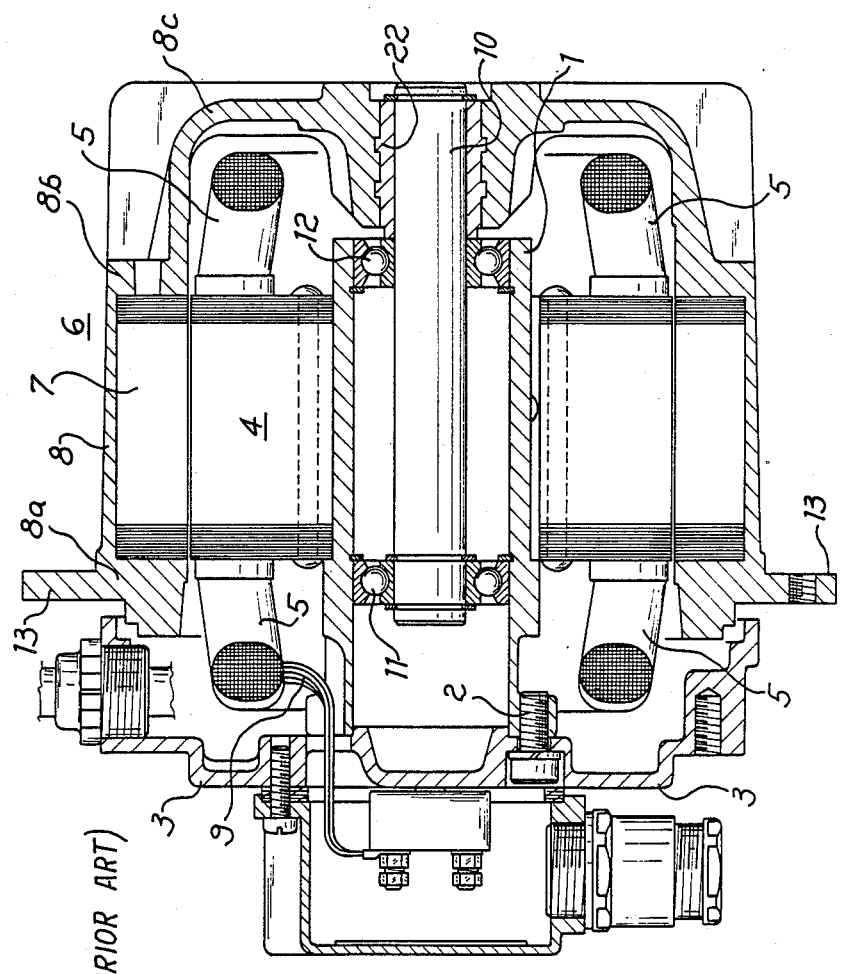
FIG. 1 is an axial sectional view of the typical structure of an external-rotor motor according to the prior art.

FIG. 1 is an axial sectional view of an asynchronous motor with an external cage rotor according to the prior art. It mainly comprises a stationary axial supporting element or bush 1, substantially cylindrical, having an end insertingly coupled and fixed with screws 2 to a stationary supporting shield 3; active stator parts, in turn comprising a pack of lamellar magnetic material 4 mounted in a force lock bit on the outer surface of the bush 1 and a field winding, of which only the heads 5 protruding from the recesses of the pack 4 are visible; and a rotor structure, generally indicated at 6 and constituted by a pack of lamellar magnetic material 7 incorporated in an external aluminum die-cast frame 8 which embraces the pack, fills its recesses to form rotor bars 5 therein (not visible in the sectional plane shown) and also forms the heads 8a, 8b which are rigidly and monolithically associated with the bars, the heads 8a and 8b functioning as both short circuiting rings of the cage and as rotor pack containment flanges. In the example shown, the flange 8a has a perforated radial extension 13 to which it is possible to fix directly, for example, the blades of a fan, not shown. On the side of the field winding opposite to the connections 9 the same aluminum die-cast frame forms a shield 8c, which is monolithic with the reminader of the frame, including heads 8a, 8b. The shield 8c is rigidly coupled to an end of a spindle 10 rotatably supported by means of ball bearings 11, 12 inside the stationary bush 1 and coaxially thereto.

The above described rotor structure 6, exemplifying the prior art, is protrudingly supported by means of the shield 8c on the spindle 10, rotatable within the bush 1 with the interposition of the bearings 11, 12 internal to the bush.

Figure 2:
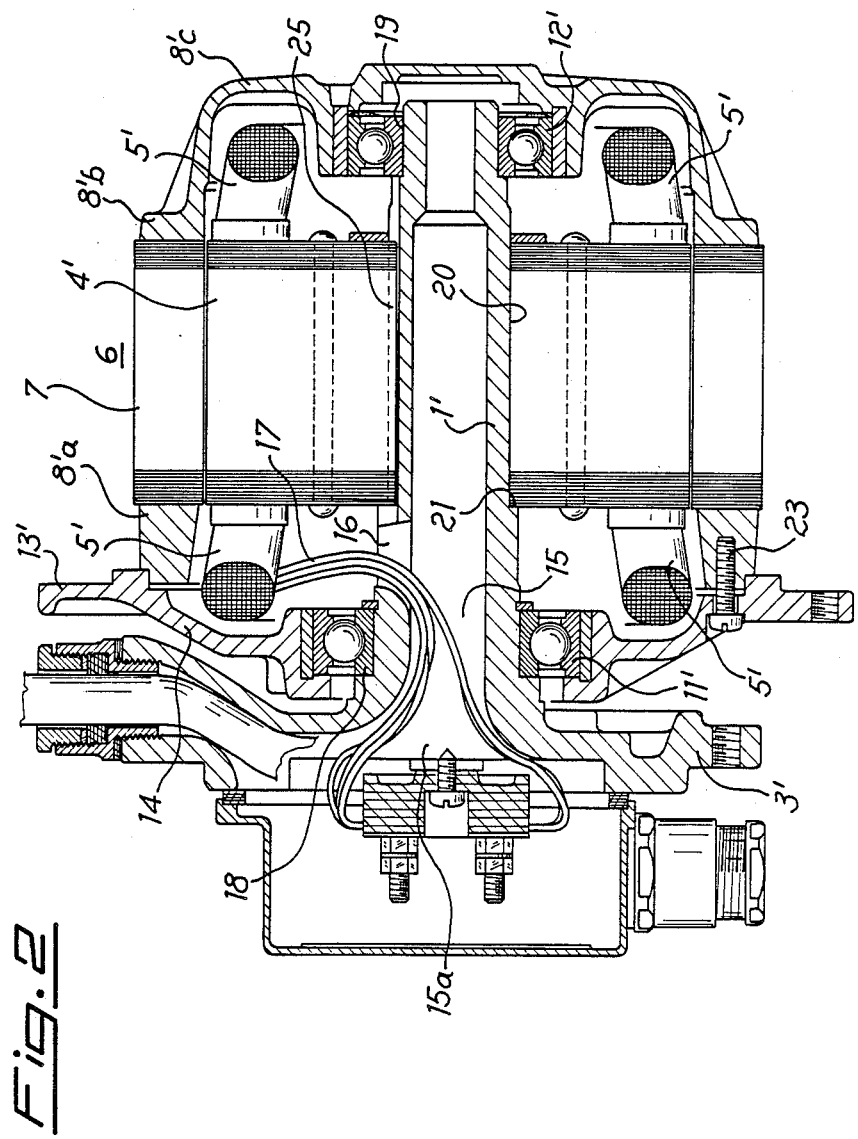
FIG. 2 is an axial sectional view of an asynchronous motor with an external cage rotor, according to the present invention.

With reference to FIG. 2, a preferred embodiment of the rotating electric machine with an external rotor according to the present invention is now described, by way of a non-limitative example, constituted by an with asynchronous motor with external cage rotor. The parts having functions equivalent or similar to those of the asynchronous motor shown in FIG. 1 are indicated in FIG. 2 with the same numeral accompanied by an index ('). In the following description, only the differences of the structure according to the present invention from that according to the prior art of FIG. 1 will be pointed out.

The rotor structure 6' (FIG. 2) comprises two shields (14, 8'c) for supporting the active rotor parts, the two shields being supported by means of bearings, respectively 11' and 12', at the two ends of the outer surface of a stationary axial supporting element or sleeve 1'. The sleeve 1' has an axial hole 15 communicating with the outer terminal board 18 through an opening in the supporting shield 3' and a radial hole 16 for the exit of the electric connections 17 of the field winding 5'.

In this structure according to the present invention the rotor part 6', differently from the solution according to the prior art, rests at both ends on the axial supporting element, or sleeve 1', instead of protrudingly, with the already mentioned advantages of greater solidity and centering. Furthermore the bearings 11', 12', being external to the axial supporting element 1', may be oversized and have normal play, with the also already mentioned advantages of greater solidity and durability.

For the same reason, the sleeve 1' can have a diameter smaller than that of the prior art supporting element 1 (FIG. 1), leaving greater room for the active material of the stator pack 4', with consequent improvement of the electric performance of the motor. Ample room is also left to interleave coupling elements between the sleeve 1' and the stator pack 4', for example of the type with a key or tab and a related seat, so as to avoid a keying obtained exclusively by forcing, which is used in the prior art, and is source of deformation of the bearing seats.

In the embodiment shown, the sleeve 1' is made by monolithic casting with the stationary supporting shield 3'. This allows a single-step mechanical machining of the bearing seats 18, 19, of the seat of the stator pack 20 and of the coupling abutment 21. The single-step machining besides reducing machining times, allows for more strict tolerances, with enhancement of the above described advantages of centering, etc. Furthermore, a single part 1' replaces four components in the prior art construction of FIG. 1 (supporting shield 3, axial supporting element 1, spindle 10 and centering bush 22).

In the embodiment of FIG. 2, the connections-side rotor shield 14 is separable from the rotor structure 6' and connected thereto by means of an insertion coupling and screws 23, for ease in assembly.

Figure 3:
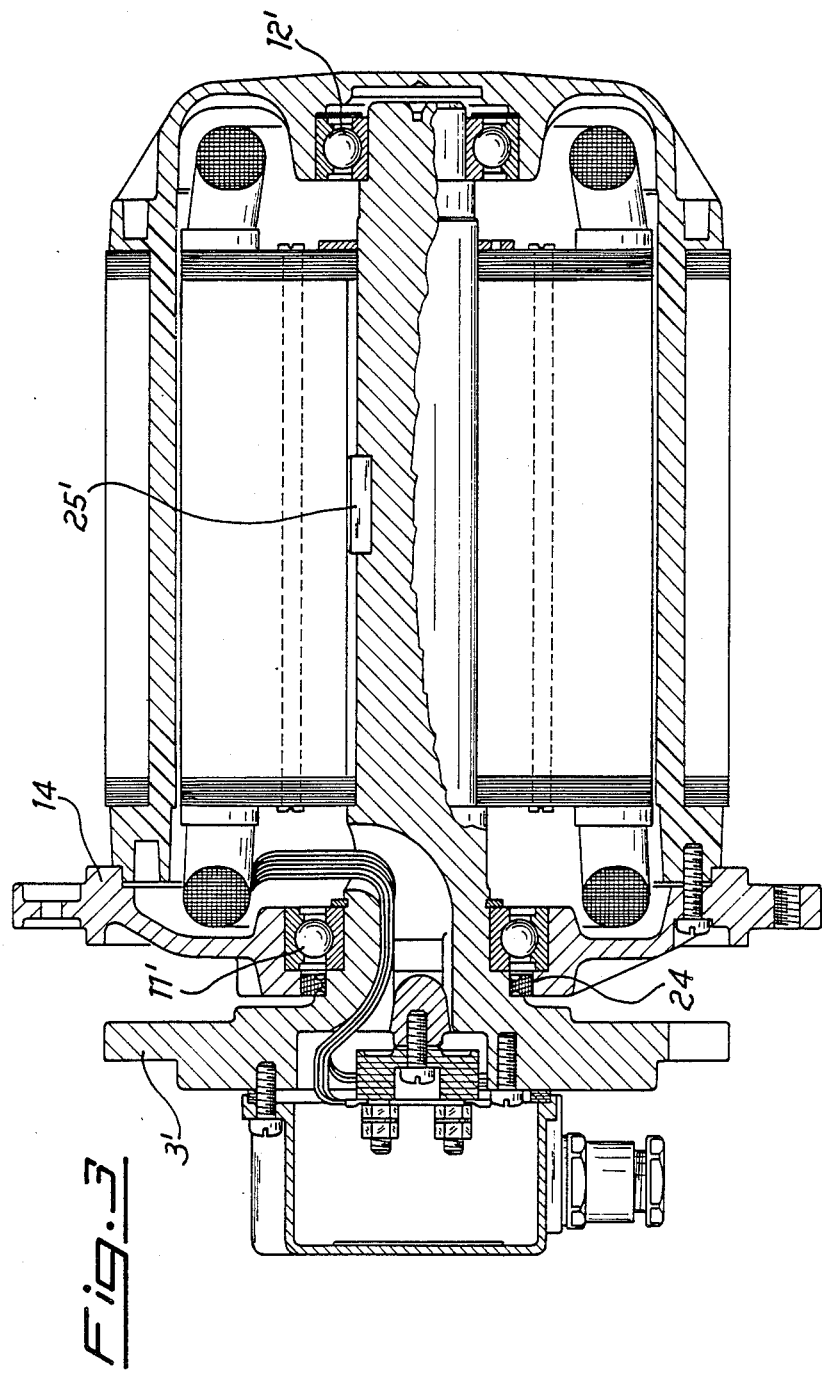
FIG. 3 is an axial sectional view of a structure similar to that of FIG. 2, in a fully enclosed version corresponding to the IP 55 protection degree according to IEC norms.

A further advantage of the construction according to the present invention is to easily allow the obtainment, in a rotating electric machine with an external rotor of the type described, of an IP 55 protection degree according to IEC norms, corresponding to a fully enclosed construction. With reference to FIG. 3, this is obtainable by means of the simple addition of an elastomeric gasket ring 24 in front of the connections-side bearing, between the rotor shield 14 and the stationary supporting shield 3'. The same figure also shows a variated aspect of the locking system with a key 251 and key-seat between the stator pack and the sleeve 1'.

As will be evident to the expert, many modifications and variations can be made in the embodiments described herein, without departing from the scope of the present invention. Furthermore, the invention is not limited in application to cage-type asynchronous motors as shown herein. It is in fact evident that the rotor with a squirrel-cage shorted winding represented herein may be replaced with a wound rotor, the winding whereof leads to a slip ring arranged externally on the rotor part, for example to a frontal slip ring applied to the outer rotating shield.

Furthermore, the construction according to the present invention is applicable to a synchronous machine, for example with a rotating external inductor with permanent magnets, or with a field winding connected to a slip ring as described above, or even to a direct-current machine, with obvious modifications.

We claim:

1. A rotating electrical machine comprising:
   a stationary support shield;
   a stationary axial supporting element in the form of a tubular sleeve monolithically integral at one end with said stationary support shield, said stationary axial supporting element having a cylindrical outer surface, said stationary axial supporting element being provided with an axial hole communicating with an outer side of the machine through an opening in said stationary support shield, said stationary support shield being further provided with a radial hole communicating with said axial hole and with an outer side of said stationary axial supporting element;
   active stator parts mounted externally to said stationary axial supporting element;
   a rotor structure rotatably mounted to said stationary axial supporting element to revolve externally and coaxially to said stator parts, said rotor structure comprising an active rotor part and support means including at least two rotor shields for supporting said active rotor part; and
   a pair of bearings disposed at opposite ends of said stationary axial supporting element to rotatably support said rotor shields on said stationary axial supporting element.

2. A rotating electrical machine according to claim 1 wherein said stator parts are included in a stator pack mounted externally to said stationary axial supporting element and fixed thereto at least in part by a tab and groove coupling.

3. A rotating electrical machine according to claim 1 wherein said rotor structure comprises a rotor cage, one of said rotor shields disposed opposite said stationary support shield being monolithically integral with said rotor cage, the other of said rotor shields proximate to said stationary support shield being insertingly mounted and fixed by means of screws to said rotor cage.

4. A rotating electrical machine according to claim 1, further comprising an elastomer gasket ring disposed between said stationary support shield and one of said rotor shields contiguous thereto, proximately to one of said bearings and on a side thereof opposite the other of said bearings, thereby completely enclosing said stator and said bearings.

5. A rotating electrical machine comprising:
a stationary support shield;
a stationary axial supporting element in the form of a tubular sleeve monolithically integral with said stationary support shield, said stationary axial supporting element having a cylindrical outer surface, said stationary axial supporting element being provided with an axial hole communicating with an outer side of the machine through an opening in said stationary support shield, said stationary axial supporting element being further provided with a radial hole communicating with said axial hole and with an outer side of said stationary axial supporting element;
a stator pack including active stator parts, said stator pack being mounted externally to said stationary axial supporting element and fixed thereto at least in part by a tab and groove coupling;
a rotor structure rotatably mounted to said stationary axial supporting element to revolve externally and coaxially to said stator parts, said rotor structure comprising an active rotor part and support means including at least two rotor shields for supporting said active rotor part; and
a pair of bearings disposed at opposite ends of said stationary axial supporting element to rotatably support said rotor shields on said stationary axial supporting element.

6. A rotating electrical machine according to claim 5 wherein said rotor structure comprises a rotor cage, one of said rotor shields disposed opposite said stationary support shield being monolithically integral with said rotor cage, the other of said rotor shields proximate to said stationary support shield being insertingly mounted and fixed by means of screws to said rotor cage.

7. A rotating electrical machine according to claim 5, further comprising an elastomer gasket ring disposed between said stationary support shield and one of said rotor shields contiguous thereto, proximately to one of said bearings and on a side thereof opposite the other of said bearings, thereby completely enclosing said stator and said bearings.

8. A rotating electrical machine comprising:
a stationary support shield;
a stationary axial supporting element in the form of a tubular sleeve monolithically integral at one end with said stationary support shield, said stationary axial supporting element having a cylindrical outer surface, said stationary axial supporting element being provided with an axial hole communicating with an outer side of the machine through an opening in said stationary support shield, said stationary axial supporting element being further provided with a radial hole communicating with said axial hole and with an outer side of said stationary axial supporting element;
a stator pack including active stator parts, said stator pack being mounted externally to said stationary axial supporting element and fixed thereto at least in part by a tab and groove coupling;
a rotor structure rotatably mounted to said stationary axial supporting element to revolve externally and coaxially to said stator parts, said rotor structure comprising a rotor cage and at least two shields at opposite ends of said cage, one of said rotor shields disposed opposite said stationary support shield being monolithically integral with said rotor cage, the other of said rotor shields proximate to said stationary support shield being insertingly mounted and fixed by means of screws to said rotor cage; and
a pair of bearings disposed at opposite ends of said stationary axial supporting element to rotatably support said rotor shields on said stationary axial supporting element, an elastomer gasket ring being disposed between said stationary support shield and one of said rotor shields contiguous thereto, proximately to one of said bearings and on a side thereof opposite the other of said bearings, thereby completely enclosing said stator and said bearings.

* * * * *